| United States Patent [19]
Modurkay

[11] 4,135,229
[45] Jan. 16, 1979

[54] SAFETY DEVICE FOR USE ON A BICYCLE WHEEL

[76] Inventor: Esteban Modurkay, 1411 Dekalb Ave., Brooklyn, N.Y. 11237

[21] Appl. No.: 829,768

[22] Filed: Sep. 1, 1977

[51] Int. Cl.² .............................................. B62J 5/00
[52] U.S. Cl. ................................... 362/72; 301/37 R; 362/78
[58] Field of Search ................. 362/72, 78; 301/37 R, 301/37 CM, 37 SA; 116/56; 340/134

[56] References Cited
U.S. PATENT DOCUMENTS

| 2,811,633 | 10/1957 | Bjork | 362/72 |
| 3,987,409 | 10/1976 | Freeman | 340/134 |

FOREIGN PATENT DOCUMENTS

| 1068313 | 2/1954 | France | 240/7.55 |
| 40682 | 12/1936 | Netherlands | 340/134 |

Primary Examiner—Charles T. Jordan
Assistant Examiner—Ralph Palo
Attorney, Agent, or Firm—C. Bruce Hamburg

[57] ABSTRACT

A safety device for use in combination with a bicycle wheel having a hub, a rim and spokes connecting the hub to the rim is provided. The safety device comprises safety light means and means for powering the safety light. The safety light means comprises socket means for receiving an electric light bulb, a housing for containing the socket means and light bulb, the housing having light transmissive side walls, and means for clamping the housing to the spokes of the wheel with the light transmissive side walls facing laterally away from the wheel. The means for powering the safety light comprises a housing for receiving at least one dry cell battery, means for clamping the battery housing to the hub, respective electrically conductive means attached to the housing for contacting the respective poles of the battery and means for electrically connecting the battery in series with the socket means.

3 Claims, 2 Drawing Figures

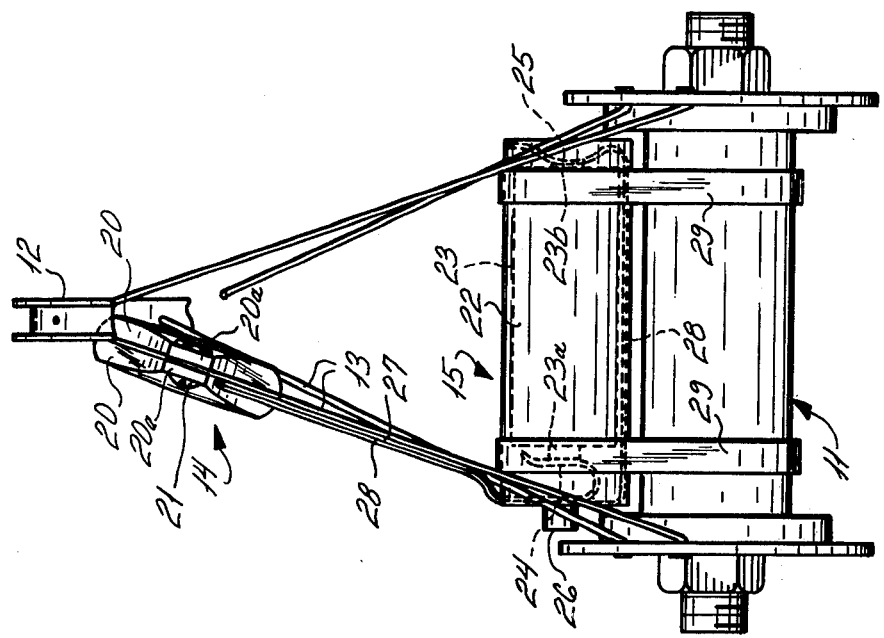
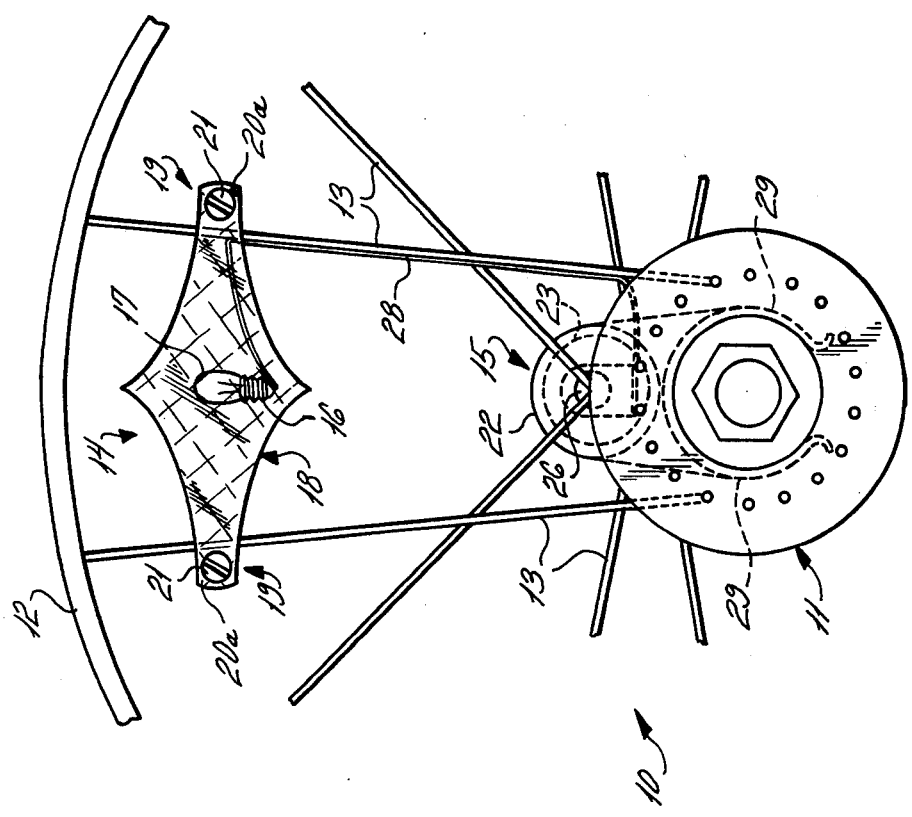

SAFETY DEVICE FOR USE ON A BICYCLE WHEEL

BACKGROUND OF THE INVENTION

This invention relates to a safety device for use in combination with a bicycle wheel having a hub, a rim and spokes connecting the hub to the rim. Federal law requires, as a safety measure, that the wheels of bicycles be provided with reflectors facing outwardly from the sides of the wheels, to augment the conventional rear reflector, in order to make the bicycles more visible at night when exposed to light from the headlights of a motor vehicle approaching the bicycle obliquely or perpendicularly. The effectiveness of this measure depends upon the owners of motor vehicles properly maintaining the headlights and turning them on as soon as they are needed as daylight fades. Moreover, the reflectors may shine more brightly under the influence of light from one angle than from another. Consequently, the safety reflectors are not the best measure that one might desire.

U.S. Pat. No. 3,987,409 discloses systems of lights fastened to the wheels of bicycles. In one system, a plurality of individually battery powered lights is attached to the spokes of the bicycle wheels and the wheels are covered on each side with an apertured cover attached to the bicycle frame so that rotation of the wheels causes the lights to pass the apertures and be visible as flashing lights to the sides. In an alternative embodiment, the plurality of lights are powered by a single generator. The locating of the batteries along with the lights on the spokes at locations quite remote from the axis of the wheel has the disadvantage of increasing the moment of inertia of the wheel; insofar as concerns a generator, not all bicycles are so equipped. U.S. Pat. No. 2,788,763 provides a wig-wag bicycle light or light holder, which does not rotate with the wheel. U.S. Pat. No. 3,764,976 discloses a pedal mounted signal light. U.S. Pat. No. 2,630,480 discloses a signal light mounted on the hub of the wheel and which does not rotate with the wheel. U.S. Pat. No. 3,005,906 discloses a battery powered light for an automobile hub cap. Being located at the center of rotation of the wheel, the light does not move along a path circumscribing a circle about the axis of the wheel. The advantage of such a path of movement of the light would be that it would make the light much more conspicuous. U.S. Pat. Nos. 3,947,070; 3,879,089 and 3,820,852 are merely representative patents disclosing various reflectors for bicycle wheels.

It is an object of the invention to provide a safety light for mounting on the spokes of bicycles for visibility from the sides of the bicycle which avoids the aforementioned shortcomings characteristic of the prior art.

Other objects and advantages of the invention will be apparent from the following description thereof.

SUMMARY OF THE INVENTION

According to the invention, there is provided a safety device for use in combination with a bicycle wheel having a hub, a rim and spokes connecting the hub to the rim. The safety device comprises safety light means and means for powering the safety light. The safety light means comprises socket means for receiving an electric light bulb, a housing for containing the socket means and the light bulb, the housing having light transmissive side walls, and means for clamping the housing to spokes of the wheel with the light transmissive side walls facing laterally away from the wheel. The means for powering the safety light comprises a housing for receiving at least one dry cell battery, means for clamping the battery housing to the hub, respective electrically conductive means attached to the housing for contacting the respective poles of the battery, and means for electrically connecting the battery in series with the socket means.

The means for electrically connecting the battery in series with the socket means preferably includes a switch for opening and closing the electrical connection means. This is for the purpose of enabling one to turn off the light when it is not needed, thereby conserving the battery.

Preferably, the light transmissive side walls comprise respective multi-faceted lenses. Such types of lenses, which are per se conventional, increase the visiblity of the light.

The invention will now be further described by reference to a particular, preferred embodiment, as illustrated in the drawings.

BRIEF DESCRIPTION OF THE DRAWINGS

FIG. 1 is a side elevation of a sector of a bicycle wheel provided with a safety device according to invention; and FIG. 2 is a front elevation of the same bicycle wheel sector as shown in FIG. 1.

DETAILED DESCRIPTION

The safety device according to the invention is intended for use in combination with a bicycle wheel 10 having a hub 11, a rim 12 and spokes 13 connecting the hub 11 to the rim 12.

The safety device according to the invention comprises safety light means 14 and means 15 for powering the safety light. The safety light means 14 comprises conventional socket means 16 for receiving an electric light bulb 17 of a small size, such as a size typical for flashlights, a housing 18 containing the socket 16 and the light bulb 17 and means 19 for clamping the housing 18 to spokes 13 of the wheel. The housing 18 is constituted of two identical halves 20 each in the form of a multi-faceted lens, which, typically but not necessarily, is constituted of transparent, red plastic. In each of the housing halves or lenses 20 is formed one half of a cylindrical recess for receiving the socket 16. The housing halves 20 include clamping projections 20a. Whereas the rest of the housing halves or lenses 20 contact each other around their peripheries, the clamping projections 20a of one housing half 20 are spaced from the clamping projections of the other housing half by a distance about equal to the diameter of the spokes 13. Each of the projections 20a has a threaded bore for receiving a screw 21. The screws 21 serve two functions, one of which is to hold the housing halves or lenses 20 together and the other of which is to cooperate with the projections 20a to clamp the housing onto the spokes 13. More specifically, the projections 20a are slightly resilient so that they tightly clamp onto the spokes 13 as the screws 21 are tightened.

The means for powering the safety light comprises a cylindrical housing 22 for receiving a dry cell battery 23, typically, but not necessarily, a type C or type D battery. Of course, the housing 22 may be sized to receive a plurality of such batteries in series. The description hereafter will be expressed in terms of a single battery but it is to be understood that herein, as well as in the claims, plural battery arrangements are also intended to be encompassed. Respective electrically conductive means, more particularly resilient electrically conductive metal elements 24 and 25 for contacting the respective positive and negative poles 23a and 23b of the battery 23 are fastened to the housing 22 by conventional means, such as rivets (not illustrated). Finally, means are provided for electrically connecting the battery in series with the socket 16. More particularly, these means are in the form of conventional insulated electric wires. A conventional switch 26 is also provided in this circuit for opening and closing the circuit, the switch being opened when it is desired to turn off the light, such as during hours of full daylight, to conserve the battery. A wire 27 extends from the contact 24 to the socket 16 and a wire 28 extends from the contact 25 to the switch 26 and then to the socket 16. Hence, there is formed a simple circuit containing the battery 23, the contacts 24 and 25, the switch 26 and the wires 27 and 28. The wires 27 and 28 may, if desired, be wrapped around a spoke 13 or tied or otherwise fastened to a spoke 13 (not illustrated). The housing 18 rotates with the wheel 10 because it is clamped to spokes 13. The housing 22 rotates with the wheel 10 because it is clamped to the hub 11 by clamp means 29. The clamp means 29 may be, for example, in the form of simple wire straps with conventional fastening means for wire straps. As a simple example, conventional hose clamps may be used as the clamp means 29.

While the invention has been particularly described by reference to a specific embodiment thereof, it is to be understood that such description is intended to illustrate the invention rather than to limit the invention, and that the scope of the invention, as defined by the hereto appended claims, includes all obvious modifications and variations.

What I claim is:

1. A safety device for use in combination with a bicycle wheel having a hub, a rim and spokes connecting the hub to the rim, the safety device comprising safety light means and means for powering the safety light, the safety light means comprising socket means for receiving an electric light bulb, a housing for containing the socket means and the light bulb, the housing being constituted of two identical halves, each of said halves being in the form of a multi-facted light transmissive lens, a pair of clamping projections extending outwardly from opposite extremities of each of the lenses, the clamping projections of one lens being spaced from the clamping projections of the other lens by a distance about equal to the diameter of the spokes, a threaded bore formed in each of the projections for receiving a screw, the threaded bores in one lens aligning with those in the other lens, a respective screw received in each two aligned bores, the screws holding the lenses together and being adapted to cooperate with the projections to clamp the housing onto the spokes with the lenses facing laterally away from the wheel, the means for powering the safety light comprising a housing for receiving at least one dry cell battery, means for clamping the battery housing to the hub, respective electrically conductive means attached to the housing for contacting the respective poles of the battery, and means for electrically connecting the battery in series with the socket means.

2. A safety device according to claim 1 in which the means for electrically connecting the battery in series with the socket means includes a switch for opening and closing the electrical connection means.

3. A safety device according to claim 1 in which the light transmissive side walls comprise respective multi-faceted lenses.

* * * * *